(12) United States Patent
Herman et al.

(10) Patent No.: US 10,703,044 B2
(45) Date of Patent: Jul. 7, 2020

(54) REMOVABLE BUILD PLATE WITH EVENLY HEATED BUILD SURFACE OF 3D PRINTER

(71) Applicant: Robert Bosch Tool Corporation, Broadview, IL (US)

(72) Inventors: Gregory A. Herman, Elk Grove Village, IL (US); Christopher R. Crowell, Chicago, IL (US)

(73) Assignee: ROBERT BOSCH TOOL CORPORATION, Broadview, IL (US)

( * ) Notice: Subject to any disclaimer, the term of this patent is extended or adjusted under 35 U.S.C. 154(b) by 431 days.

(21) Appl. No.: 15/661,910

(22) Filed: Jul. 27, 2017

(65) Prior Publication Data

US 2019/0030806 A1 Jan. 31, 2019

(51) Int. Cl.
| | |
|---|---|
| *B29C 64/245* | (2017.01) |
| *B33Y 30/00* | (2015.01) |
| *B29C 64/295* | (2017.01) |
| *B29C 64/106* | (2017.01) |
| *B29C 64/209* | (2017.01) |
| *B29C 64/118* | (2017.01) |

(52) U.S. Cl.
CPC .......... *B29C 64/245* (2017.08); *B29C 64/106* (2017.08); *B29C 64/118* (2017.08); *B29C 64/209* (2017.08); *B29C 64/295* (2017.08); *B33Y 30/00* (2014.12)

(58) Field of Classification Search
CPC ... B29C 64/245; B29C 64/118; B29C 64/295; B29C 64/209; B29C 64/106; B33Y 30/00
USPC ....................................................... 425/375
See application file for complete search history.

(56) References Cited

U.S. PATENT DOCUMENTS

| | | | |
|---|---|---|---|
| 2017/0151704 A1* | 6/2017 | Go ........................ | B29C 64/321 |
| 2017/0190120 A1 | 7/2017 | Bloome et al. | |

(Continued)

FOREIGN PATENT DOCUMENTS

| | | |
|---|---|---|
| EP | 3064339 A1 | 9/2016 |
| WO | 2016/033286 A1 | 3/2016 |
| WO | 2017/074387 A1 | 5/2017 |

OTHER PUBLICATIONS

International Search Report dated Nov. 2, 2018 for corresponding PCT Application No. PCT/EP2018/069212.

*Primary Examiner* — Joseph S Del Sole
*Assistant Examiner* — Lawrence D. Hohenbrink, Jr.
(74) *Attorney, Agent, or Firm* — Norton Rose Fulbright US LLP

(57) ABSTRACT

A 3D printer for synthesizing objects includes: an extruder configured to extrude layers of filament through a nozzle onto a build surface; a build platform; and a build plate that is structured for being removably clamped to the build platform and that includes the build surface, where the build platform includes a base, a heating layer, at least one compressible biasing element arranged between the base and the heating layer, and a clamp, and where the build platform is configured for receiving the build plate into a clamping position in which the clamp is configured to releasably clamp the build plate onto the build platform above the heating layer, causing the at least one compressible biasing element to compress and bias the heating layer upwards towards the clamped biasing plate for even distribution of heat by the heating layer over the planar extension of the build surface.

20 Claims, 6 Drawing Sheets

(56) References Cited

U.S. PATENT DOCUMENTS

2017/0355139 A1* 12/2017 Wolf .................... B29C 48/802
2017/0371317 A1    12/2017 Share et al.
2018/0154589 A1     6/2018 Herman et al.
2019/0118467 A1*  4/2019 Neboian ................ B33Y 10/00

* cited by examiner

REMOVABLE BUILD PLATE WITH EVENLY HEATED BUILD SURFACE OF 3D PRINTER

FIELD OF THE INVENTION

The present invention relates to a 3D printer that includes a removable build plate structured for even heating across a build surface of the build plate when arranged in the 3D printer, and relates to a corresponding build plate arrangement of a 3D printer.

BACKGROUND

Three-dimensional (3D) printing, or additive manufacturing, is a process of making three dimensional solid objects, for example, based on blueprints provided by digital files and/or by scanning a solid object to be copied by the 3D printer. The synthesis of the desired 3D solid object is achieved by strategically generating successive layers of an additive material in a pattern on a platform of a 3D printer until the entire object is created. The synthesis of the 3D object can be driven, for example, by the digital files that provide the specifications that describe how to create the pattern of layers and the materials used to generate the object.

3D printers are generally protected from external influences by a build cage, and, within the build cage, the 3D printer includes the build platform on which the synthesis process is executed. Before building (printing) a 3D object on the build platform, the build platform should be set to a level state. For this purpose, the build platform can include a platform frame on legs, e.g., two front legs and one center rear leg, and a platform plate on the platform frame, with springs, for example at positions corresponding to each of the front two legs, biasing the platform plate upwards away from the platform frame but being independently compressible for moving the platform plate downward closer to the platform frame at the two front legs until the build platform is determined to be at a level state, at which point the position of the platform plate relative to the platform frame can be locked.

The generation of the successive layers of the additive material can be performed, for example, according to any one of: (1) Vat Photopolymerisation, (2) Material Jetting, (3) Binder Jetting, (4) Direction Energy Deposition, (5) Powder Bed Fusion, (6) Sheet Lamination, or (7) Material Extrusion. Specific processes of Material Extrusion used to generate the successive layers can involve making sequential deposits using fused deposition modeling ("FDM"), fused filament fabrication ("FFF"), or Direct Ink Writing ("DIW").

The materials used as the "ink" of the 3D printer to generate the 3D object can include, for example, filaments of any of: powder material, polymer material, thermoplastics, eutectic metals, edible materials, rubbers, modeling clay, plasticine, metal clay, ceramic materials, metal alloys, papers, composite materials composed of ceramics and metallic materials ("cermet"), metal matrix composites, ceramic matrix composites, photopolymers, plaster, stainless steel, aluminum, plastic film, and metal foil. The filament is heated at the printer head, extruded through a nozzle, and deposited onto a build surface of the build platform, for example, as described in U.S. patent application Ser. No. 15/195,456, filed Jun. 28, 2016 and in U.S. patent application Ser. No. 15/371,018, filed Dec. 6, 2016, the content of each which are hereby incorporated by reference herein in their entireties.

Some 3D printers include a heater in the build platform for heating the build surface of the build platform because, without such a heater, many of the materials used for the filament would not properly stick to the build surface and would warp due to the extruded material cooling too quickly and also because the synthesized 3D object deposited onto the build surface may be difficult to remove when it cools on the platform surface.

Some 3D printers provide a removable build plate that can be placed onto the build platform and is removable from the build platform and that includes the build surface onto which the filament is deposited during printing. An advantage of the removable build plate is that a user can remove the synthesized 3D object that has been deposited on the build surface without worrying about damaging parts, such as rails and electronics, of the 3D printer as a user might be when removing the synthesized 3D object by reaching into the build cage and removing the synthesized 3D object from the build surface while the object is still in the build cage, which would restrict the degree of freedom in moving the user's hands while removing the object, leading to discomfort to the user and potentially damaging the synthesized object due to an awkward motion used for removing the object. For example, one such printer includes a ramp shaped track into which the build plate can be inserted, with the track guiding the plate into its proper position for printing.

SUMMARY 3D printers that include removable build plates are conventionally held in place in the printing position at one or more fastening positions. For example, in the case of the 3D printer that includes a ramp shaped track, the build plate is held in the printing position by a groove, forming part of the track, in one or more of side walls of the build platform.

Where such printer provides a heater for heating the surface of the build plate, the heater is held firmly relative to the build plate more closely to the build plate surface at those fastening positions than at other positions so that there is a greater gap between the center of the build surface and the heater than between an edge(s) of the build surface and the heater, resulting in uneven heating of the build surface. However, even a small air gap between the heater and the build surface can create a significant temperature drop in the area of the build surface opposite the air gap, which, for example, can cause the 3D object to warp or not stick to the build surface.

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

Example embodiments of the present invention provide an arrangement with a removable build plate and a heater, where the heater evenly heats the build surface of the build plate across the entirety of the build surface. In an example embodiment, the heater is a printed circuit board assembly (PCBA) heater that includes one or more meandering and heating traces. In example embodiments, a compressible layer is arranged between the platform frame and the heater, the compressible layer biasing the heater away from the platform frame and towards the build plate. In example embodiments, a layer, including compressible elements at a plurality of positions of the layer, is arranged between the platform frame and the heater, the compressible elements biasing the heater away from the platform frame and towards the build plate. The layer thus applies pressure to the heater towards the build plate evenly across the build plate surface.

In an example embodiment, the arrangement includes a foam layer as the compressible layer, where the foam layer is flexible over its surface in order for its shape to conform over its surface to the shapes of the layers between the foam layer and the build plate layer, including a heating layer that includes the heater for heating the build plate, thereby biasing the layer(s) between the foam layer and the build plate to be evenly pressed towards the build plate, thereby causing even distribution of heat of the heating layer across the surface of the build surface of the build plate. For example, in an example embodiment, the foam is PORON®, which is a fine pitch open cell urethane foam produced by Rogers Corporation.

PORON® can melt at 60-80° C. and can therefore melt if too much heat from the heater spreads to the foam layer. For example, in an example embodiment, a foamed silicone that can withstand much higher temperatures than PORON®, is used as the material of the foam layer.

However, while they do have a spring characteristic, PORON® and foamed silicone are still somewhat stiff materials. Therefore, in an example embodiment of the present invention, the foam layer is in the form of a plurality of crossbars forming a grid of voids or through-holes that are each surrounded by respective subsets of the crossbars. The voids provide the foam layer with additional flexibility to be able to bend across the foam layer, allowing the foam layer to better conform to the layers above and below the foam layer, ensuring an even application of heat by the heating layer to the build surface of the build plate by the foam cross bars forming a plurality of pressure points that are spread across the surface of the foam layer and that press the heating layer towards the build plate.

In an alternative example embodiment, a platform plate of the build platform, for example a platform plate that is adjustably connected to a platform frame for adjusting the level of the build surface, is a metal plate with metal cut-outs arranged at a plurality of positions across its surface, forming fingers that are biased upwards to push the heating layer toward the build plate. However, this may require the platform plate to be formed of spring steel, which is an expensive material.

In an example embodiment, the arrangement includes an insulating below the heating layer and above the compressible layer or layer with compressible elements and above the platform frame and/or platform plate to prevent heat from traveling downward away from the heater in a direction away from the build plate, thereby preventing heat waste and/or preventing heat damage of the lower layers.

In an example embodiment, a layer below the compressible layer or the layer that includes compressible elements includes clips extending upward and that can engage with a rim of the build plate to clamp the build plate down to the build platform against the spring force of the compressible layer or layer with compressible elements. Alternatively, the build plate can include the clips and engage with the layer below the compressible layer or layer that includes the compressible elements. However, it is preferable for the clips to be arranged on the lower layer in order for the removable build plate to be provided with a substantially flat surface, without downward protrusions that can make it more difficult to set the build plate down when it is removed from the build platform. The layer below the compressible layer or layer that includes the compressible elements, which layer includes the clips that engage with the rim of the build plate, can be, for example, the platform frame or the platform plate.

Additionally, a layer below the compressible layer or layer that includes compressible elements can include a wall or wall sections that extend upward and that can engage with the rim of the build plate at an opposite side of the rim of the build plate with which the clips engage. (It is noted that in some embodiments, the rim can be rotatable to be clipped into the build platform in one direction at one time, but clipped in while rotated 180 degrees another time, so that one side of the rim engages the clips in one instance, but engages the wall or wall sections in another instance. In other embodiments, the rim is structured differently at its two opposite sides so that it can only be inserted into the build platform in a single direction.) Additionally, like the clips, in an alternative example embodiment, the build plate can include the wall or wall sections and engage with the layer below the compressible layer or layer that includes the compressible elements. However, it is preferable for the wall or wall sections to be arranged on the lower layer in order for the removable build plate to be provided with a substantially flat surface, without downward protrusions that can make it more difficult to set the build plate down when it is removed from the build platform. The layer below the compressible layer or layer that includes the compressible elements, which layer includes the wall or wall sections that engage with the rim of the build plate, can be, for example, the platform frame or the platform plate. In an example embodiment, the same lower layer includes both the clips and the wall or wall sections. However, in an alternative example embodiment, the clips can be formed on one lower layer and the wall or wall sections can be formed on a different lower layer.

In an example, the wall or wall sections is/are rigid (or relatively rigid compared to the clips), while the clips are flexible. In this way, the build plate can be inserted into and fastened to the build platform by placing a first edge of the rim of the build plate against the rigid wall or wall sections at an angle of less than 90°, e.g., at approximately a 45° angle and then lowering an opposite second edge of the rim of the build plate so that it engages with the flexible clips, pushing the clips outwards in a direction away from the opposite wall or wall sections, until the second edge of the rim reaches a lowest position at which the clips spring back towards the opposite wall or wall sections, thereby clamping the build plate down to the build platform. For example, in an example embodiment, each clip includes a protrusion at a top section of the clip, the protrusion protruding inward towards the opposite wide at which the wall or wall sections are located. When the second edge of the rim of the build plate is initially lowered into contact with the flexible clip, the build plate initially engages the protrusion of the clip, which protrusion can slope downwardly in an inwardly direction towards the opposite side at which the wall or wall sections are located, the engagement forcing the clip to flex outwardly. Once the second edge of the rim of the build plate is lowered to below the inward protrusion, there is again a clearance between the clip and the build plate, allowing the clip to flex inwardly again, so that the protrusion is positioned over, and clamps down on, the build plate.

In an example embodiment, the wall section(s) is L-shaped, with a protrusion at a top of the wall section(s) extending horizontally inward towards the front rim of the build plate at which the clips are located so that when the clips clamp the front rim down, the inwardly projecting protrusion of the wall section(s) clamps the rear rim of the build plate down. In an example embodiment, the wall section(s) are formed of sheet metal.

In an example embodiment, there only one clip is provided. In alternative example embodiments a plurality of clips are provided. In a particularly preferable example embodiment, two clips are provided for handling by respective hands of a user to pull the clips away from the build plate when removing the build plate from the build platform, for example, when printing of the 3D object has completed. In this regard, for the user to remove the build plate from the build platform, the user can pull back on the clips while lifting the second edge of the rim of the build plate, thereby unclamping the build plate so that it is easily removable from the 3D printer.

In an example embodiment, the build plate includes a center build region surrounded by a frame. The center build region can be, for example, glass or metal or can be made from another suitably appropriate material, the temperature of which can be adequately raised by the heater. The frame can be formed of a material whose temperature does not rise as much and/or as quickly as the center build region, e.g., the material of the frame can have a higher specific heat capacity. If the user touches the center build region after the object has been formed, for example, in order to remove the build plate from the 3D printer, the user might burn the user's hands. The frame therefore provides a region of the build plate that can be safely handled for removing the build plate from the 3D printer.

In an example embodiment, the rim of the build plate includes protrusions that protrude outward away from each other and from the regions of the rim that engage with the flexible clips. In an example, the protrusions are located at or near respective corners of the rim, with the edge of the rim that engages with the clips extending between those respective corners. In an example, the clips are positioned so that, when the build plate is inserted for clamping by the clips to the build platform, the clips are each located near a respective one of the rim protrusions, the clips being configured to flex outward and inward in a direction approximately perpendicular to the direction in which the rim protrusions extend outward away from each other. In this way, a user can lift up on the build plate by placing, for example, the user's index fingers under the rim protrusions and applying upward pressure on the underside of the rim protrusions while pressing the clips outwardly with the user's thumbs, away from the build plate. This arrangement makes it easy for the user to remove the build plate without mistakenly touching the hot center build region, thereby avoiding burning the user's hands.

In an example embodiment, the clips are arranged at a front of the 3D printer at which a user has access to the interior of the build cage, e.g., a side at which the build platform includes springs against which the platform plate can be lowered for leveling the build surface.

In an example embodiment, one or more bars, screws, bolts, or the like (hereinafter referred to as bolts) extend from the platform plate or platform frame of the build platform through the upper layers of the build platform above the platform plate or platform plate, including the compressible layer or layer with compressible elements, the insulating layer, and the heating layer, but not through the removable build plate. A nut is fastened below the bottom-most of those layers of the build platform, e.g., below the platform frame, with an end-stop at the opposite end of the bolt countersunk into the heating layer to keep the layers together and aligned (alternatively a bolt with two end stops can be used instead of using a nut). However, the nut does not tightly press those layers together, so that the compressible layer or compressible elements are not compressed prior to the clamping of the build plate to the build platform and so that, when the build plate is clamped down to the build platform, the clamping causes the layers through which the bolts extend to be pressed together, while the bolts are pressed downwards to extend further through and below the platform frame.

According to the example embodiment in which the compressible layer is formed of a plurality of crossbars, the crossbars form a respective intersection nodes for each of the bolts, the respective intersection nodes each including a bore there-through, through which a respective one of the bolts extends.

An example embodiment of the present invention is directed to a 3D printer that is configured to synthesize 3D objects by extruding layers of filament, the 3D printer including: an extruder including a nozzle, the extruder being configured to extrude the layers of filament through the nozzle onto a build surface; a build platform; and a build plate that is structured for being removably clamped to the build platform and that includes the build surface, where the build platform includes a base, a heating layer, at least one compressible biasing element arranged between the base and the heating layer, and a clamp, and where the build platform is configured for receiving the build plate into a clamping position in which the clamp is configured to releasably clamp the build plate onto the build platform above the heating layer, causing the at least one compressible biasing element to compress and bias the heating layer upwards towards the clamped biasing plate for even distribution of heat by the heating layer over build surface.

In an example embodiment, the at least one compressible biasing element is a compressible layer arranged between the base and the heating layer.

In an example embodiment, the compressible layer is formed of a foam material.

In an example embodiment, the foam material is a foamed silicone.

In an example embodiment, the compressible layer is formed of PORON®.

In an example embodiment, the base is a platform frame on which a platform plate is arranged, and the at least one compressible biasing element includes a plurality of biasing fingers cut out of the platform plate.

In an example embodiment, the platform plate and the biasing fingers are metallic.

In an example embodiment, the clamp includes at least one flexible clip and at least one opposing vertical support; and the build platform is configured for receiving the build plate by a first edge of the build plate being held against the vertical support and a second edge of the build plate being rotated downwards towards the at least one flexible clip while the first edge of the build plate is held against the vertical support, until the second edge of the build plate contacts the at least one flexible clip, at which point the at least one flexible clip is configured to bend in a direction away from the vertical support with continued downward rotation of the first edge of the build plate until the first edge of the build plate reaches a locking position at which point the at least one flexible clip is configured to snap back in a direction towards the vertical support, thereby locking the build plate to the build platform.

In an example embodiment, the at least one flexible clip includes a lip that extends in a direction towards the vertical support and that is configured to apply pressure down onto a top of the build plate when the build plate is in the locking position.

In an example embodiment, the vertical support includes a lip that extends in a direction towards the at least one flexible clip and that is configured to extend over a top of the build plate when the build plate is in the locking position.

In an example embodiment, the lip is configured to apply pressure down onto the top of the build plate when the build plate is in the locking position.

In an example embodiment, the vertical support curves as it vertically extends to accommodate rotation of the build plate while the build plate is held against the vertical support.

In an example embodiment, the vertical support includes, at a top thereof, a horizontally extending lip.

In an example embodiment, the build platform further includes an insulating layer between the heating layer and the at least one compressible biasing element, where the insulating layer is configured to thermally insulate portions of the build platform below the insulating layer from heat generated by the heating layer.

In an example embodiment, the clamp includes two flexible clips; the build plate includes (a) a first groove in a front edge of the build plate, at or near a first front corner of the build plate and (b) a second groove in the front edge of the build plate, at or near a second front corner of the build plate; the two flexible clips are configured to latch onto the front edge of the build plate in the first and second grooves, respectively; and the build plate includes (a) a first protrusion at or near the first front corner, protruding laterally from a first side edge of the build plate in a first direction away from the grooves and (b) a second protrusion at or near the second front corner, protruding laterally from a second side edge of the build plate in a second direction away from the grooves.

In an example embodiment, the build plate includes a glass center build region and a plastic build frame surrounding the center build region, the grooves are formed in the plastic build frame, and the first and second protrusions are formed in one piece with the plastic build frame.

In an example embodiment, the heating layer includes a printed circuit board heater.

In an example embodiment, the base includes a platform frame and a platform plate adjustably connected to the platform frame, and the clamp is formed in one piece with the platform plate.

An example embodiment of the present invention is directed to a build platform for a 3D printer that is configured to synthesize 3D objects by extruding layers of filament onto a build surface of a build plate, the build platform including: a base; a heating layer; at least one compressible biasing element arranged between the base and the heating layer; and a clamp, where the build platform is configured for receiving the build plate into a clamping position in which the clamp is configured to releasably clamp the build plate onto the build platform above the heating layer, causing the at least one compressible biasing element to compress and bias the heating layer upwards towards the clamped biasing plate for even distribution of heat by the heating layer over a planar extension of the build surface.

An example embodiment of the present invention is directed to a build plate including a build surface for a three-dimensional (3D) printer that is configured to synthesize 3D objects by extruding layers of filaments onto the build surface of the build plate, the build plate including: a glass center build region; and a plastic build frame surrounding the center build region, where the build frame includes: a first groove in a front edge of the build plate, at or near a first front corner of the build plate; a second groove in the front edge of the build plate, at or near a second front corner of the build plate; a first protrusion at or near the first front corner, protruding laterally from a first side edge of the build plate in a first direction away from the grooves; and a second protrusion at or near the second front corner, protruding laterally from a second side edge of the build plate in a second direction away from the grooves.

Although various aspects of the example embodiments of the present invention may be described independently, combinations of the example embodiments are understood to be referred to herein. In addition, and conversely, it should be understood that although a feature may be described in the context of a combination with other features, the different features are separable and do not necessarily require or rely on one another for a functional or useful embodiment of the present invention.

The aspects described in the foregoing are presented merely to provide a brief summary of these example embodiments, and these aspects are not intended to limit the scope of this disclosure. Indeed, the present invention may also encompass a variety of other aspects. These and other features, aspects, and advantages of the present invention are further clarified by the following detailed description of certain exemplary embodiments in view of the accompanying drawings throughout which like characters represent like parts.

DETAILED DESCRIPTION

Figure 1:
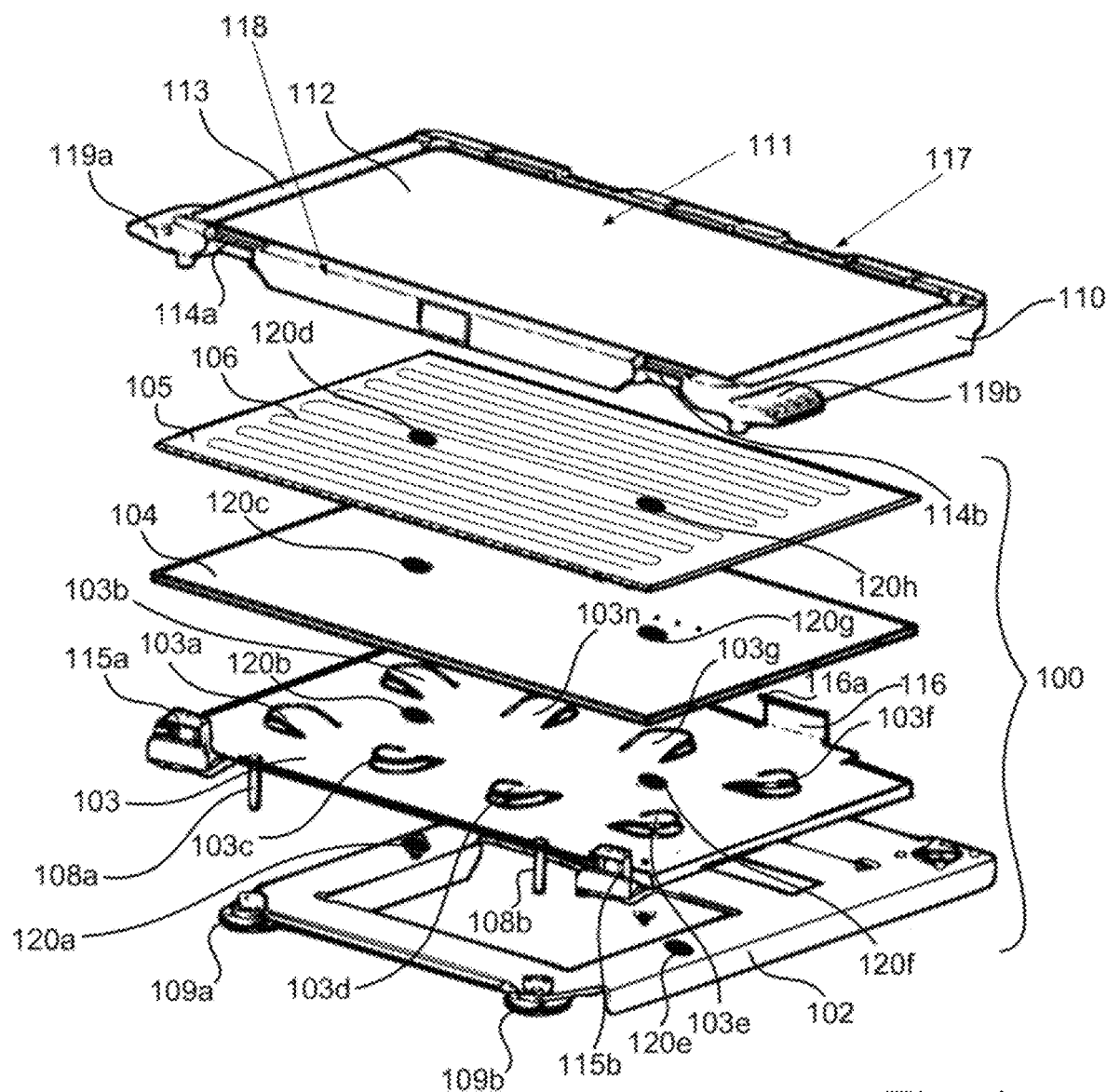
FIG. 1 is an exploded view of a build platform and removable build plate arrangement, including a layer with compressible elements, in the form of fingers, according to an example embodiment of the present invention.

FIG. 1 is an exploded view of an arrangement including a build platform 100 and removable build plate 110, according to an example embodiment of the present invention.

The build platform includes a platform frame 102, a platform plate 103, an insulating layer 104, and a heating layer 105, e.g., in the form of a PCBA heater including a heating trace(s) 106. The platform plate 103 is a metal plate including a plurality of cutouts forming fingers 103a-n biased upwards, biasing the insulating layer 104 and heating layer 105 upwards away from the platform frame 102. The platform plate 103 includes adjusting pins 108*a* and 108*b* that are insertable into respective ones of front legs 109*a* and 109*b* of the platform frame 102 at respective depths that are independently adjustable, by applying a force against a respective spring 603*a*/603*b* (shown in FIG. 6) for adjusting a level of a build surface 111 of the build plate 110.

The build plate 110 includes a center build region 112, e.g., of glass, surrounded by a build plate frame 113, e.g., of plastic. The build plate frame (or rim) 113 includes grooves 114*a* and 114*b* for accommodating and in which the build plate frame 113 engages with flexible clips 115*a* and 115*b* of platform plate 103. The platform plate 103 further includes a rigid wall section(s) 116 (of which only one is shown in FIG. 1) against which a rear edge 117 of the build plate frame 113 can be placed, under an inwardly projecting lip 116*a* of the wall section(s) 116, when inserting the build plate 110 into the build platform 100. For example, the rear edge 117 of the build plate 110 can be held against the rigid wall section(s) 116 at less than a 90° angle, e.g., at approximately a 45° angle, and, while continuing to hold the rear edge 117 of the build plate frame 110 against the rigid wall section(s) 116, the front edge 118 of the build plate 110 can be rotated downwards until the region of the build plate frame 113 in grooves 114*a* and 114*b* come into contact with the flexible clips 115*a* and 115*b*, casing the clips 115*a* and 115*b* to bend forward, until the front edge 118 of the build plate 110 reaches its lowest position at which point the flexible clips 115*a* and 115 spring backward again, clamping the build plate 110 down to the build platform 100.

In an example embodiment, the platform frame 102, platform plate 103, insulating layer 104, and heating layer 105 each includes through-holes 120*a*-*d* and 120*e*-*h* through which respective bolts (not shown) extend with a respective nut at the respective bottoms of the bolts under platform frame 102, the bolts including respective end stops at their respective ends opposite the ends at or near which the nuts are positioned so that layers 102, 103, 104, and 105 are loosely sandwiched between the bolt end stops and the nuts, with the fingers 103*a*-*n* applying a spring force so that the layer stack of layers 102, 103, 104, and 105 are stacked over a large length of the bolts, but the fingers 103*a*-*n* being compressible when the build plate 110 is clamped down to the build platform 100 by the clips 115*a*-*b* so that the layer stack of layers 102, 103, 104, and 105 occupies less of a length of the bolts.

In an example embodiment of the present invention, the build plate 110 includes rim protrusions 119*a*-*b* to aid in the insertion and/or removal of the build plate 110 into and/or from the build platform 100. For example, to insert the build plate 110 into the build platform 100, a user can hold onto the rim protrusions 119*a*-*b* of the build plate 110 using the user's left and right hands, respectively, and position the rear of the edge 117 of the rim of the build plate 110 against the wall section(s) 116 under the lip(s) 116*a*, and then rotate the from edge 118 of the build plate frame 113 of the build plate 110 downward while continuing to hold the rim protrusions 119*a*-*b*, with the rear edge 117 pivoting against the wall section(s) 116. Then, to subsequently remove the build plate 100 from the build platform 100, the user can place the user's index fingers, for example, under the rim protrusions 119*a*-*b* and apply upward pressure on the underside of the rim protrusions 119*a*-*b*, while using the user's thumbs to press or pull the clips outwardly in a direction away from the wall section(s) 116, and away from the build plate 110.

Figure 2:
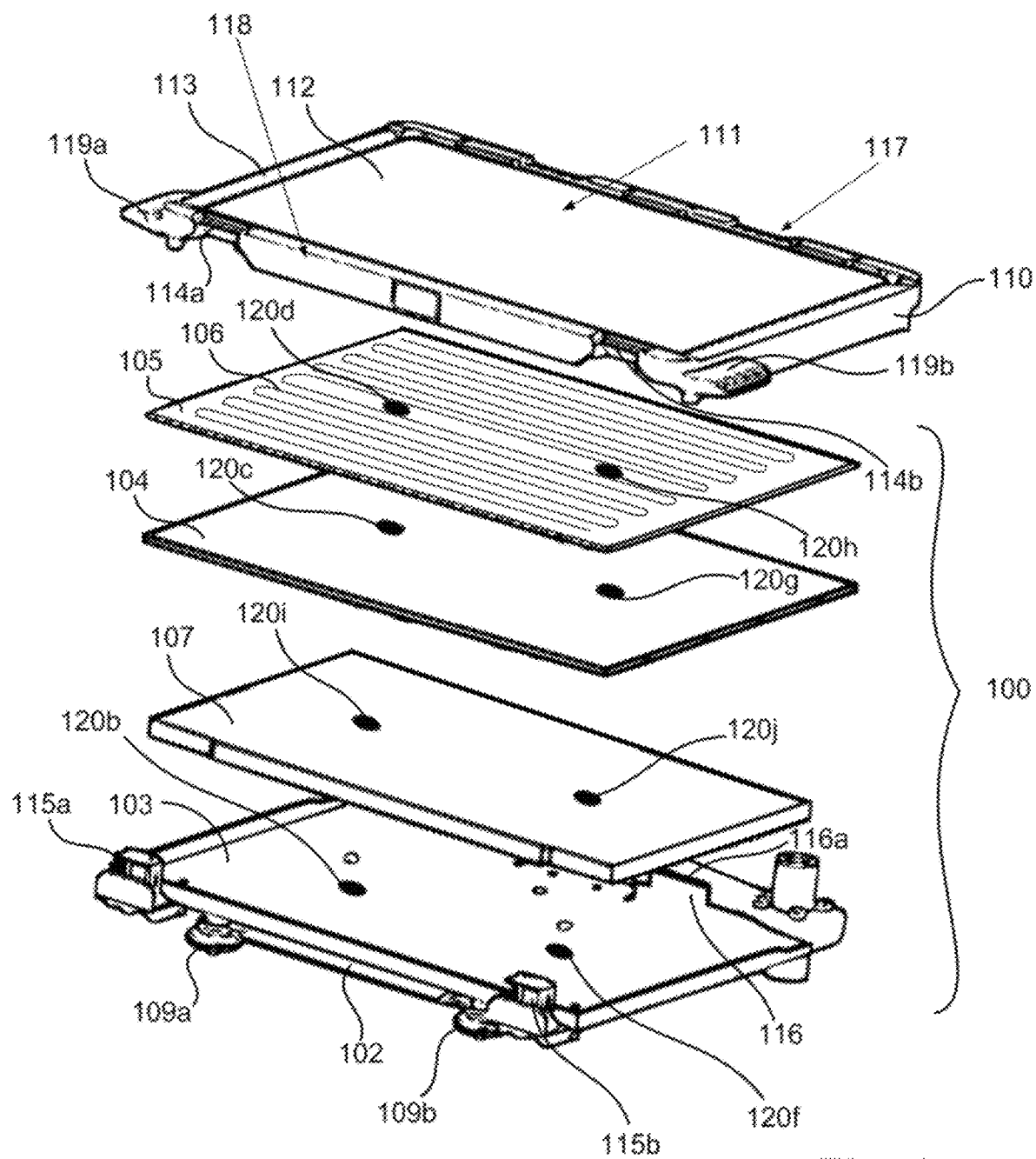
FIG. 2 is an exploded view of a build platform and removable build plate arrangement, including a compressible layer, according to an alternative example embodiment of the present invention.

FIG. 2 shows an alternative example embodiment in which instead of fingers 103*a*-*n* formed in platform plate 103, the build platform 100 includes a compressible layer 107, for example, of foam for applying a force to press heating layer 105 against build plate 110 uniformly across the under surface of build plate 110 for even heating by the heating trace(s) 106 (or other heating element) of the build surface 111. In FIG. 2, platform plate 103 is shown lying against the platform frame 102. The clips 115*a*-*b* and the wall section(s) 116 are shown as being part of platform plate 103 in this embodiment as well. The compressible layer 107 includes through-holes 120*i* and 120*j* for accommodating the bolts as described above with respect to through-holes 120*a*-*d* and 120*e*-*h*.

Figure 3:
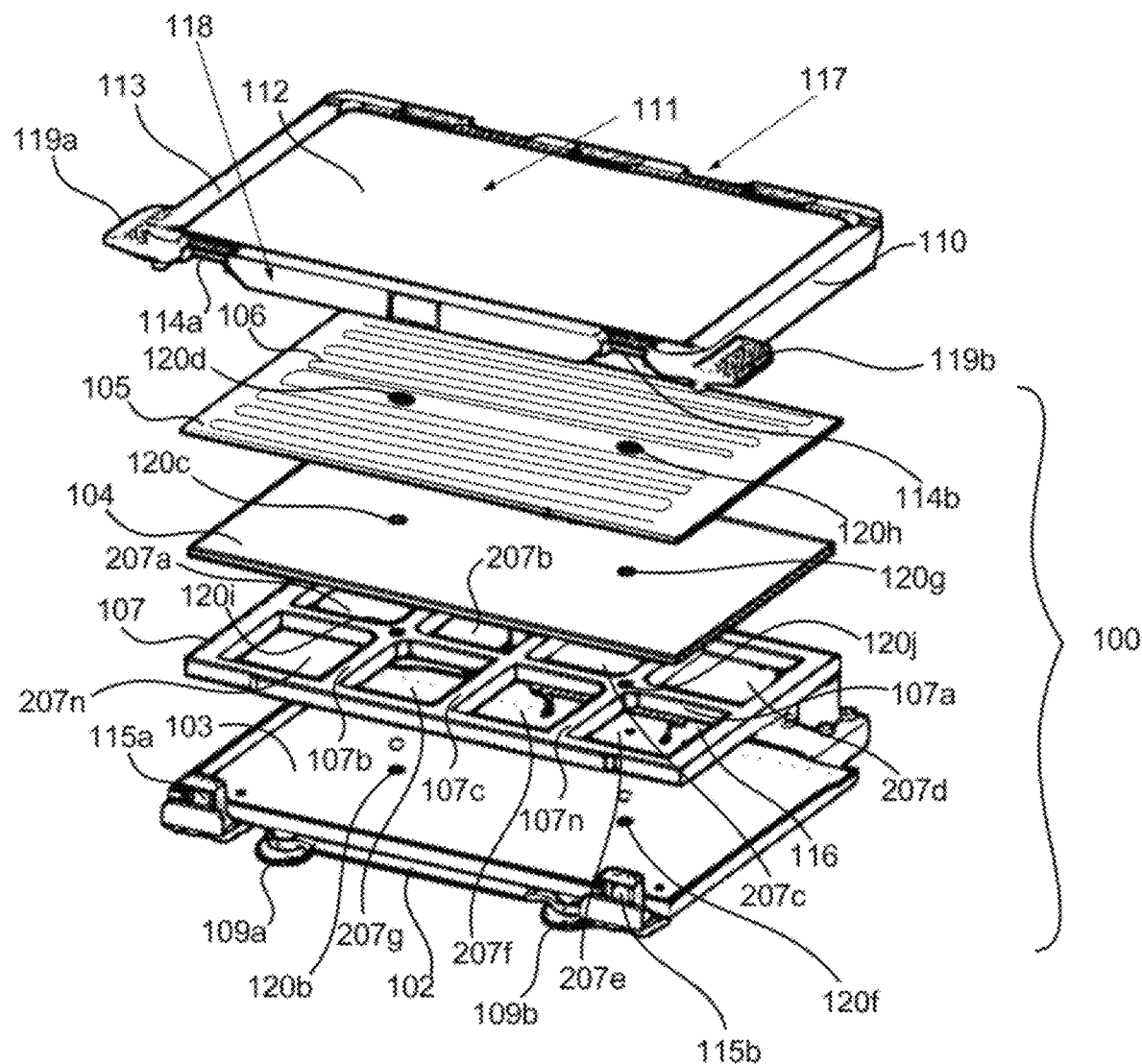
FIG. 3 is an exploded view of a build platform and removable build plate arrangement, including a compressible layer in the form of compressible crossbars and a grid of voids, according to an alternative example embodiment of the present invention.

FIG. 3 shows an alternative example embodiment in which compressible layer 107 includes a grid of voids or through-holes 207*a*-*n* formed by crisscrossing crossbars 107*a*-*n*. The compressible layer 107 is provided with increased flexibility due to the grid of voids 207*a*-*n*, allowing the layer to contour as necessary in accordance with different pressure applied at different points across the layer 107 due to the clamping of build plate 110 at clamping positions corresponding to the clips 115*a*-*b* and lips 116*a* of wall section(s) 116, while the foam crossbars 107*a*-*n* provide the spring force for even distribution of pressure across heating layer 105 against build plate 110, thereby ensuring an even application of heat to the build surface 111 of the build plate 110. Because of the voids 207*a*-*n*, a high temperature foam, such as the foamed silicone, which can otherwise be somewhat stiff with respect to bendability, can be used as the material for compressible layer 107. The intersection of crossbars 107*a* and 107*b* and the intersection of crossbars 107*a* and 107*n* are shown to form respective nodes through which through-holes 120*i*-*j* are formed.

Figure 4:
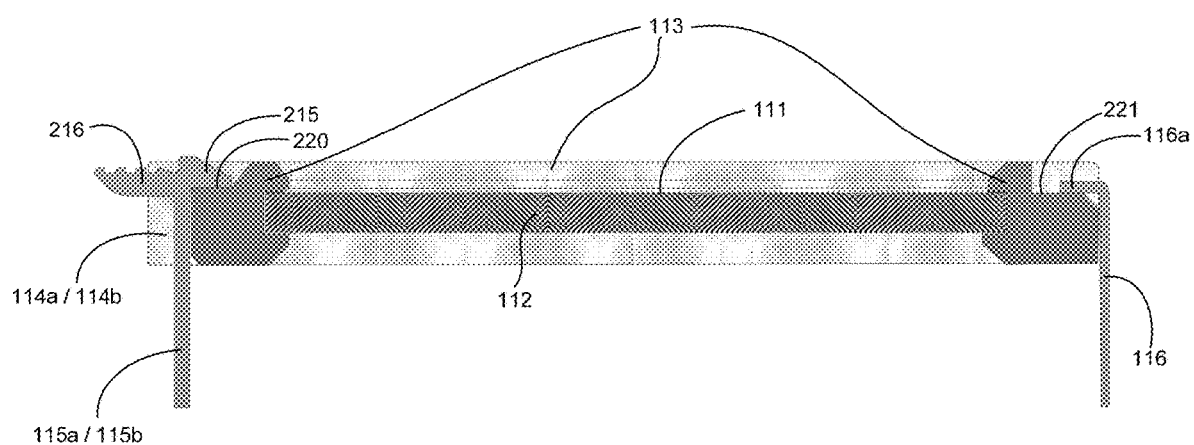
FIG. 4 is a cross-sectional view showing details of certain portions of the build plate and the build platform, according to an example embodiment of the present invention.

FIG. 4 is a cross-sectional view showing portions of build plate frame 113, center build region 112, a wall section 116 with its inwardly projecting lip 116*a*, a clip 115*a*/115*b*, and a groove 114*a*/114*b*. The portions of build plate frame 113 illustrated in FIG. 4 in a dark color are those within the illustrated cross-section, whereas the remainder of the illustrated portion of build plate frame 113, shown in a light color, is that which is not in the cross-section to which, but is rather at other cross-sections viewable from the illustrated cross-section. In an example embodiment, the clips 115*a*/115*b* include respective inwardly projecting lips 215 which clamp down on an upper surface 220 of build plate frame 113 within the grooves 114*a*/114*b* at the front edge 118 of the build plate frame 113. Similarly, the lip 116*a* of wall section 116 clamps down on an upper surface 221 build plate frame 113 within grooves at the rear edge 117 of the build plate frame 113. In an example embodiment, the clips 115*a*/115*b* include a corrugated upper surface at a section 216, as shown in FIG. 4, for easy grip by a user when thumbing the slips 115*a*/115*b* away from the build plate 110 to remove the build plate 110 from the build platform 100.

Figure 5:
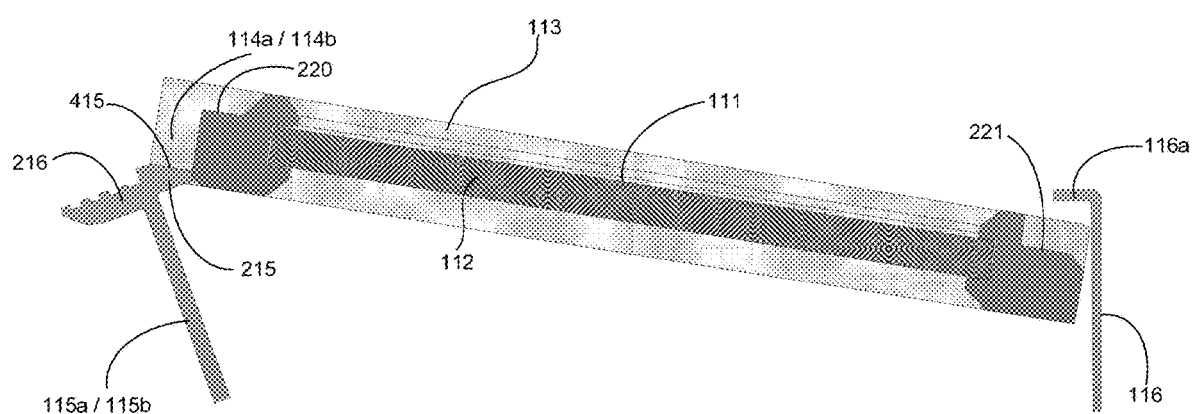
FIG. 5 is a cross-sectional view showing the build plate in a position in which it deflects clips of the build platform, according to an example embodiment of the present invention.

FIG. 5 shows the cross-section of FIG. 4 at a time when the build plate frame 113 has engaged the clips 115*a*/115*b*, e.g., by engaging a ramp section 415 of the clips 115*a*/115*b*, thereby causing the clips 115*a*/115*b* to deflect in a direction away from the build plate 110 and the wall section(s) 116. Once the build plate is positioned at the position shown in FIG. 4, the clips 115*a*/115*b* snap back to clamp the build plate 110 in the position shown in FIG. 4. (It is noted that the ramp contour can instead or additionally be formed on the build plate frame 113 at the grooves 114*a*/114*b*.)

Figure 6:
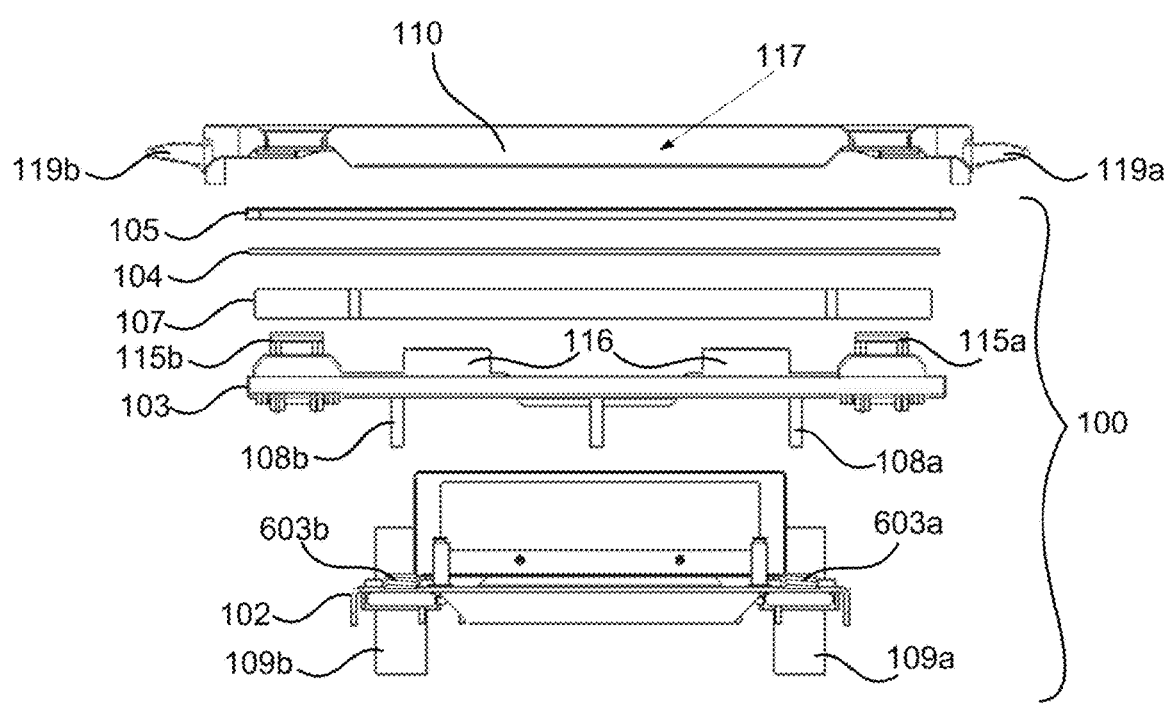
FIG. 6 shows a rear view of the build plate and build platform according to an example embodiment of the present invention.

FIG. 6 is a rear exploded view of the build plate 110 and build platform 100 according to an example embodiment of the present invention.

The embodiments described above, which have been shown and described by way of example, and many of their advantages will be understood by the foregoing description, and it will be apparent that various changes can be made in the form, construction and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives falling with the spirit and scope of this disclosure.

That is, the above description is intended to be illustrative, and not restrictive, and is provided in the context of a particular application and its requirements. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not be limited to the embodiments shown and described, since various modifications will become apparent to the skilled practitioner upon a study of the drawings, specification, and following claims. For example, components and functionality may be separated or combined differently than in the manner of the various described embodiments, and may be described using different terminology. These and other variations, modifications, additions, and improvements may fall within the scope of the disclosure as defined in the claims that follow.

What is claimed is:

1. A three-dimensional (3D) printer that is configured to synthesize 3D objects by extruding layers of filament, the 3D printer comprising:
   an extruder including a nozzle, the extruder being configured to extrude the layers of filament through the nozzle onto a build surface;
   a build platform; and
   a build plate that is structured for being removably clamped to the build platform and that includes the build surface;
   wherein:
   the build platform includes a base, a heating layer, at least one compressible biasing element arranged between the base and the heating layer, and a clamp; and
   the build platform is configured for receiving the build plate into a clamping position in which the clamp is configured to releasably clamp the build plate onto the build platform above the heating layer, causing the at least one compressible biasing element to compress and bias the heating layer upwards towards the clamped build plate for even distribution of heat by the heating layer over the build surface.

2. The 3D printer of claim 1, wherein the at least one compressible biasing element is a compressible layer arranged between the base and the heating layer.

3. The 3D printer of claim 2, wherein the compressible layer is formed of a foam material.

4. The 3D printer of claim 3, wherein the foam material is a foamed silicone.

5. The 3D printer of claim 2, wherein the compressible layer is formed of PORON®, which is a fine pitch open cell urethane foam.

6. The 3D printer of claim 1, wherein the base is a platform frame on which a platform plate is arranged, and the at least one compressible biasing element includes a plurality of biasing fingers cut out of the platform plate.

7. The 3D printer of claim 6, wherein the platform plate and the biasing fingers are metallic.

8. The 3D printer of claim 1, wherein:
   the clamp includes at least one flexible clip and at least one opposing vertical support; and
   the build platform is configured for receiving the build plate by a first edge of the build plate being held against the vertical support and a second edge of the build plate being rotated downwards towards the at least one flexible clip while the first edge of the build plate is held against the vertical support, until the second edge of the build plate contacts the at least one flexible clip, at which point the at least one flexible clip is configured to bend in a direction away from the vertical support with continued downward rotation of the first edge of the build plate until the first edge of the build plate reaches a locking position at which point the at least one flexible clip is configured to snap back in a direction towards the vertical support, thereby locking the build plate to the build platform.

9. The 3D printer of claim 8, wherein the at least one flexible clip includes a lip that extends in a direction towards the vertical support and that is configured to apply pressure down onto a top of the build plate when the build plate is in the locking position.

10. The 3D printer of claim 8, wherein the vertical support includes a lip that extends in a direction towards the at least one flexible clip and that is configured to extend over a top of the build plate when the build plate is in the locking position.

11. The 3D printer of claim 10, wherein the lip is configured to apply pressure down onto the top of the build plate when the build plate is in the locking position.

12. The 3D printer of claim 8, wherein the vertical support curves as it vertically extends to accommodate rotation of the build plate while the build plate is held against the vertical support.

13. The 3D printer of claim 12, wherein the vertical support includes, at a top thereof, a horizontally extending lip.

14. The 3D printer of claim 1, wherein the build platform further includes an insulating layer between the heating layer and the at least one compressible biasing element, wherein the insulating layer is configured to thermally insulate portions of the build platform below the insulating layer from heat generated by the heating layer.

15. The 3D printer of claim 1, wherein:
   the clamp includes two flexible clips;
   the build plate includes (a) a first groove in a front edge of the build plate, at or near a first front corner of the build plate and (b) a second groove in the front edge of the build plate, at or near a second front corner of the build plate;
   the two flexible clips are configured to latch onto the front edge of the build plate in the first and second grooves, respectively; and
   the build plate includes (a) a first protrusion at or near the first front corner, protruding laterally from a first side edge of the build plate in a first direction away from the grooves and (b) a second protrusion at or near the second front corner, protruding laterally from a second side edge of the build plate in a second direction away from the grooves.

16. The 3D printer of claim 15, wherein the build plate includes a glass center build region and a plastic build frame surrounding the center build region, the grooves are formed in the plastic build frame, and the first and second protrusions are formed in one piece with the plastic build frame.

17. The 3D printer of claim 1, wherein the heating layer includes a printed circuit board heater.

18. The 3D printer of claim 1, wherein the base includes a platform frame and a platform plate adjustably connected to the platform frame, and the clamp is formed in one piece with the platform plate.

19. A build platform for a three-dimensional (3D) printer that is configured to synthesize 3D objects by extruding layers of filament onto a build surface of a build plate, the build platform comprising:
   a base;
   a heating layer;
   at least one compressible biasing element arranged between the base and the heating layer; and
   a clamp;
   wherein the build platform is configured for receiving the build plate into a clamping position in which the clamp is configured to releasably clamp the build plate onto the build platform above the heating layer, causing the at least one compressible biasing element to compress and bias the heating layer upwards towards the clamped biasing build plate for even distribution of heat by the heating layer over a planar extension of the build surface.

20. A build plate including a build surface for a three-dimensional (3D) printer that is configured to synthesize 3D objects by extruding layers of filament onto the build surface of the build plate, the build plate comprising:
   a glass center build region; and
   a plastic build frame surrounding the center build region, wherein the build frame includes:
      a first groove in a front edge of the build plate, at or near a first front corner of the build plate;
      a second groove in the front edge of the build plate, at or near a second front corner of the build plate;
      a first protrusion at or near the first front corner, protruding laterally from a first side edge of the build plate in a first direction away from the grooves; and
      a second protrusion at or near the second front corner, protruding laterally from a second side edge of the build plate in a second direction away from the grooves.

* * * * *